United States Patent Office 3,148,643
Patented Sept. 15, 1964

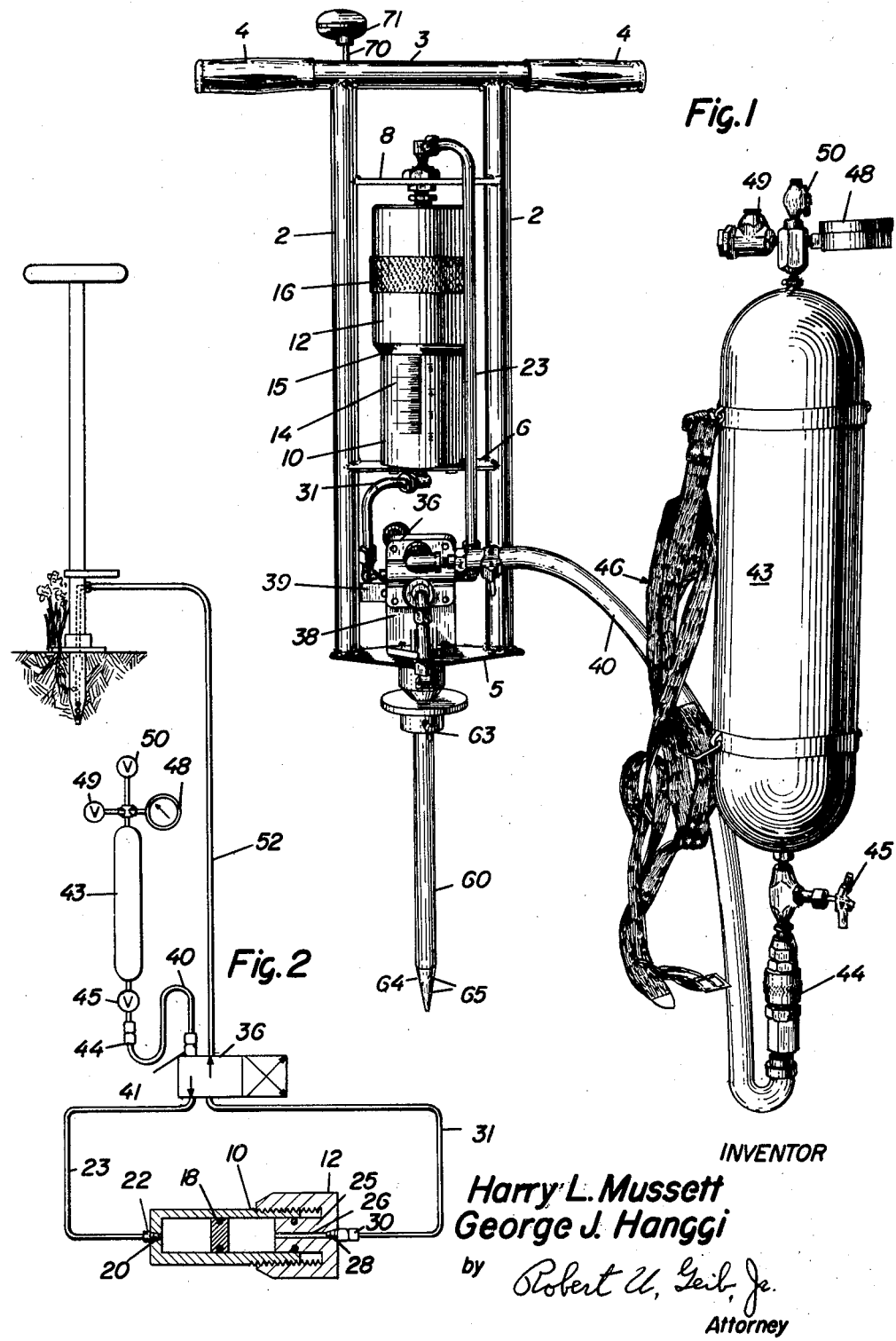

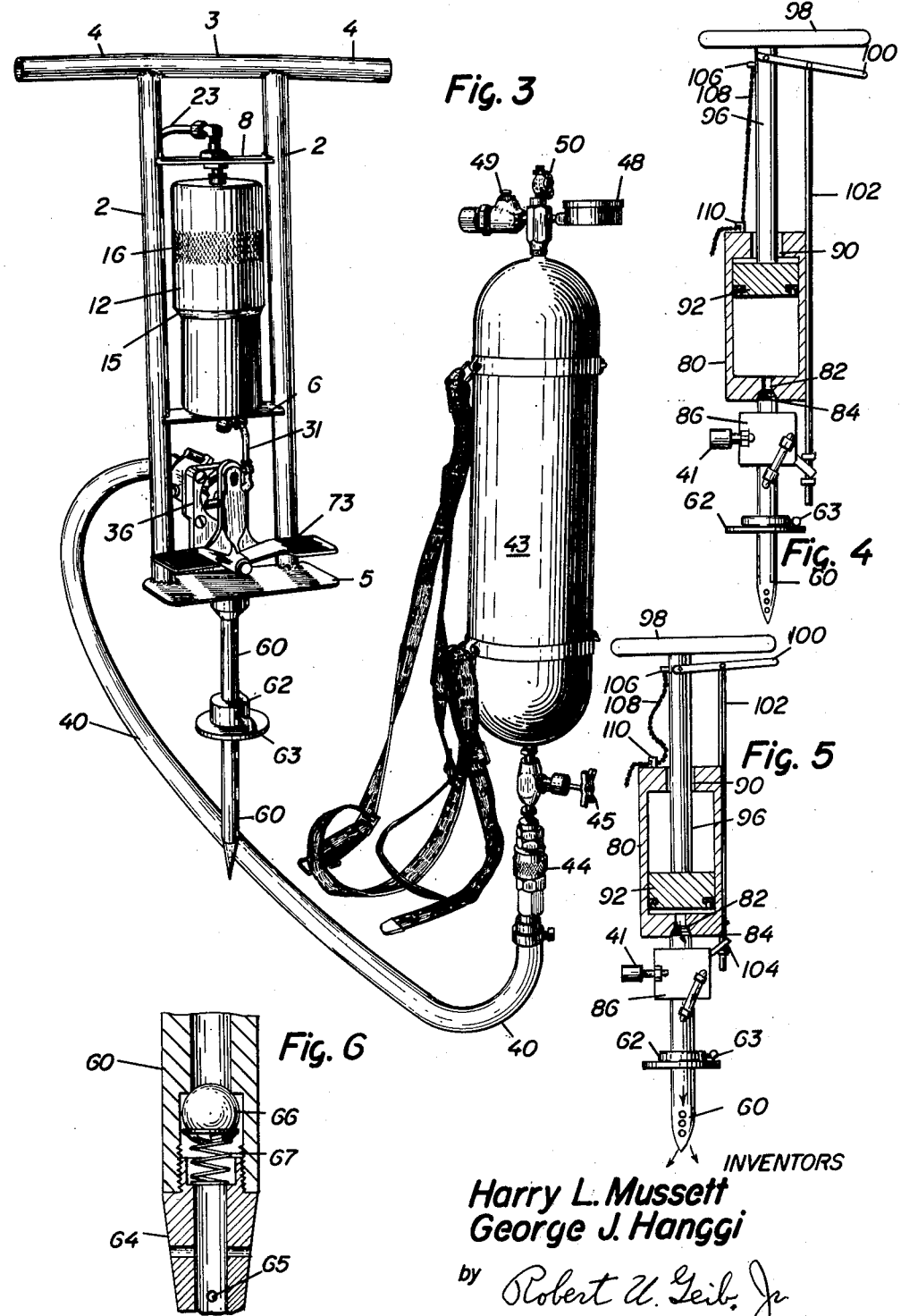

3,148,643
SOIL INJECTION APPARATUS
Harry L. Mussett and George J. Hanggi, both of Ponca City, Okla., assignors to Continental Oil Company, Ponca City, Okla., a corporation of Delaware
Filed Nov. 16, 1961, Ser. No. 152,805
4 Claims. (Cl. 111—7.4)

This invention relates to injection apparatus, and more particularly to apparatus for injecting materials into the earth, atlhough not limited thereto.

In horticultural and agricultural fertilizing operations, it is the general practice to spread solid fertilizer on the surface of the ground around the plant. Manifestly, there are many disadvantages to this procedure, such as: losses to the atmosphere and/or to other vegetation, uncertainty as to the rate of penetration into the ground, etc.

It is among the objects of the present invention to provide an apparatus which may be operated to inject a measured quantity of fertilizer, or other material, in the proximity of the plant roots, thereby obtaining increased efficiency.

Another object is the provision of an easily operated apparatus of the type described which is portable, relatively simple and easy to manufacture, and durable in service.

The invention, then, comprises the features hereinafter fully described and as particularly pointed out in the claims, the following description and the annexed drawings setting forth in detail certain illustrative embodiments of the invention, these being indicative of some of several ways in which the principles of the invention may be employed.

In said drawings:

FIGURE 1 is an elevational view of the main operating elements of an apparatus which has been constructed in accordance with the teachings of the present invention;

FIGURE 2 is a diagrammatic view illustrating the manner of operation of the various elements of the apparatus;

FIGURE 3 is an elevational view of a modified form of the apparatus;

FIGURE 4 is an elevational view of another modification, but deleting the portable tank or reservoir and the flexible conduit which connects it to the main operating elements;

FIGURE 5 is a view of the elements of FIGURE 4, but showing certain of the operating elements in another stage of operation; and FIGURE 6 is an enlarged, fragmentary view, partly in section, of one of the structural details of the apparatus.

Referring more particularly to the drawings, the numeral 2 generally designates a frame which carries the largest portion of the operating elements of the apparatus, and which is adapted for manual manipulation by the operator thereof. More specifically, the frame comprises a pair of parallel tubes 2 which are connected at one of their ends by a cross-member 3 provided with projecting ends which terminate in handles 4. The opposite ends of the parallel tubes 2 are connected by a transversely extending plate 5. Intermediate the cross-member 3 and plate 5 is a pair of spaced parallel bars 6 and 8 which likewise extend transversely of the tubes 2. The bar 6 which is disposed relatively adjacent the plate 5 carries a cylinder 10 which extends into relative adjacency with respect to the bar 8. This end of the cylinder 10 is open; and, over it, there is disposed a tubular cap or cylinder head 12 which is in screw-threaded engagement therewith.

The side wall of the cylinder 10 is marked with calibrations 14; and the lower end of the tubular cylinder head 12 is bevelled, as at 15, in the manner of the barrel of a micrometer; whereby accurate adjustment of the displacement of the cylinder (and head) may be effected. Ease of manual rotation of the tubular cylinder head 12 (and, accordingly, the adjustment of the displacement of the cylinder 10) is enhanced by a knurled area 16.

Within the cylinder 10, there is a floating piston 18 (see FIGURE 2), the purpose of which will be described hereinafter.

The bottom or base of the cylinder 10 is provided with a central screw-threaded aperture 20 which receives an exteriorly screw-threaded coupling 22 attached to one end of a tubular conduit 23.

The interior of the tubular cap or cylinder head 12 carries a cylindrical plug 25 whose periphery closely conforms in size and contour to the bore of the cylinder 10. The cylindrical plug 25 is provided with a central bore 26 which communicates with an interiorly screw-threaded aperture 28 in the end wall of the tubular cap or cylinder head 12. This screw-threaded aperture 28 receives an exteriorly screw-threaded coupling 30 attached to one end of a tubular conduit 31.

In a manner which will be fully explained hereinafter, the cylinder 10 is adapted to receive the liquid to be injected through the tubular conduit 23 and to transmit the same in adjustably measured quantities through the tubular conduit 31 due to the operation of the floating piston 18.

The power for operating the floating piston 18 is supplied by the vapor pressure of the liquid to be injected. At the completion of a stroke (for effecting an injection of the treating liquid), and upon the operation of the reversing valve, the liquid in the cylinder 10 that furnished the power then becomes the injection charge. That is, the operation of the valve automatically causes the discharge of the contents of the cylinder, while, at the same time, permitting the accumulation therein of another charge (of liquid) for a subsequent operation. This injection-reloading valve may take the form of a conventional four-way, or four-port, valve 36 comprising an operating lever which is operably connected to a conveniently disposed foot pedal, operating rod, etc.

The four-way valve 36 is attached to the plate 5 by a vertical support 38 and to one of the longitudinal members 2 by a transverse brace 39.

As shown in FIGURES 1 and 3, one of the ports of the four-way valve 36 is connected to the tubular conduit 23, while another is connected to the tubular conduit 31. That portion of the four-way valve which is opposite the terminal of the conduit 23 is provided with a port which communicates with a flexible conduit 40 through a quick-detachable connector 41. The other end of the flexible conduit 40 is connected to a portable tank 43 through a quick-detachable connector 44 and an intercommunicating manually operable valve 45, which is shown as secured to the bottom of said tank.

Preferably, both elements of each of the quick-detachable connectors 41 and 44 are provided with a check valve (not shown) which stops the flow of liquid upon disconnection.

The portable tank 43, which carries the fluid or liquid to be injected, is shown as provided with a sling 46 to enable it to be more easily carried by the operator of the apparatus.

A pressure gauge 48, pressure relief valve 49 and bleed valve 50 are shown as mounted atop the portable tank 43.

Depending from the bottom of the plate 5 at the lower end of the frame 2 is a rigidly mounted tubular injection probe 60 through which the treating fluid or liquid is injected. Excessive penetration of the injection probe is prevented by a slidable collar 62 provided with an inwardly extending set screw 63.

Referring to FIGURE 6, the lower end of the tubular injection probe 60 is provided with a removably mounted "point" 64 having an intercommunicating bore, and outlet orifices 65 in the sidewall thereof. In a chamber formed between the main body portion of the injection probe 60 and its "pointed" extension 64, there is a ball-type check valve 66 which is influenced upwardly against the lower end of the bore of the probe by a resilient spring 67. The purpose of the check valve 66 is to hold the treating liquid in a liquid state as long as possible and to prohibit the back diffusion of moisture vapors.

It will be observed that, in the embodiment of FIGURE 1, the four-way valve 36 is operated by an operating rod 70 which extends slightly above the cross-bar 3 of the frame and carries a conveniently disposed operating knob 71.

In FIGURE 3, the rotatable operating shaft of the four-way injection-reloading valve is provided with a foot pedal 73 which is disposed immediately above the plate 5 at the bottom of the frame 2.

Operation

As a typical example of the field of utility of the apparatus of the present invention, and the manner in which it is used, the portable tank or reservoir may be filled with liquid ammonia. With the tank in an upright position, and the manually operable valve 45 in open position, liquid ammonia may be fed from any suitable source into the bottom of the tank through the quick-detachable connector 44. The bleed valve 50 at the top of the tank is opened slightly; and when the tank 43 is full, the liquid ammonia will discharge through it. The bleed valve 50 is then closed, together with the valve 45 at the bottom of the tank. The quick-detachable connector 44 is disconnected from the source of liquid ammonia (not shown) and connected with its complementary element on the end of the flexible conduit 40. The valve 45 is then opened.

With the displacement of the cylinder 10 and the position of the depth-guard plate 62 (on the tubular injection probe 60) appropriately adjusted, the apparatus is now ready for service.

With the operator gripping the handles 4 of the frame 2, the injection probe 60 is inserted to the desired depth, applying foot-pressure, if necessary, to the plate 5 at the bottom of the frame.

With the probe 60 inserted in the ground, the four-way injection-reloading valve 60 may initially be operated two or three times for the purpose of cooling the unit in order that the ammonia will remain in liquid form until it reaches its desired place in the soil. After this initial cooling, the unit will be self-cooling, and will deliver the desired quantities of the liquid ammonia as long as it is kept in constant service.

For each injection, the floating piston or plunger 18 in the cylinder 10 (see FIGURE 2) is moved only once; that is, its movement in either direction will deliver the amount which has been determined in advance and indicated by the calibrations 14 on the outside of the cylinder 10.

As previously mentioned, the power for operating the floating piston or plunger 18 is supplied by the vapor pressure of the liquid in the portable tank 43. Upon the movement of the floating piston in one direction (for example, to the left as viewed in the diagram of FIGURE 2), the liquid treating material is moved through the conduit 23 and that portion of the four-way valve 36 with which it is then in communication with a conduit 52 which, in turn, communicates with the bore of the injection probe 60. After such movement of the floating piston 18, the liquid which caused it then becomes the next charge to be injected. That is, the movement, by the operator, of the stem of the four-way valve 36 in the opposite direction will admit liquid through the conduit 23 and into the left-hand side of the floating piston 18; whereupon it will move to the right and force the liquid on that side (and which was formerly the motivating liquid) through the conduit 31 to and through the appropriate ports of the four-way valve 36 and the aforementioned conduit which communicates with the bore of the injection probe.

A number of types of suitable four-way valves are readily available commercially; and, as such, the injection-reloading valve 36 which is illustrated and described herein forms no part of the present invention.

During the discharge of the liquid through the injection probe 60, the operator will notice a slight vibration of the apparatus which terminates when the injection is complete.

When the portable tank 43 is empty, the pressure indicated by the pressure gauge 48 will begin to drop with each injection. At the same time, the operator will notice a rather sharp knock at the end of each injection, which is caused by the floating piston 18 striking the cylinder stops in the absence of the cushioning effect of the liquid.

In the event excessive pressures develop in the portable tank 43, such as might occur if it is exposed to strong sunlight for prolonged intervals, they will be relieved by the relief valve 49; and the shut-off valve 45 is used when, for any reason, isolation of the tank is desired.

The modification illustrated in FIGURES 4 and 5 of the drawings comprises, in its broadest aspects, the substitution of a three-way injection-reloading valve for the four-way valve 36, together with a manually operated piston or plunger for the floating piston or plunger 18. More specifically, in FIGURES 4 and 5, there is provided a cylinder 80 having a central screw-threaded aperture 82 in the bottom thereof which communicates, as at 84, with a conventional three-way valve 86. As an alternative, this three-way valve 86 may take the form of a conventional four-way valve with one of the ports blocked or sealed off. In either instance, one of the ports of the three-way valve 86 communicates with the quick-detachable connector 41 on the flexible conduit 40 to receive liquid from the portable tank 43; another port communicates with the conduit that supplies the liquid to the bore of the injection probe; and the third port communicates (through the connector 84 and aperture 82) with the lower end of the interior of the aforementioned cylinder 80. The upper end or head of the cylinder 80 has an aperture 90 which may, if desired, be provided with a suitable bearing.

A piston 92 is disposed within the cylinder 80 and is secured to a piston rod 96 which extends through, and projects from, the aperture 90. The upper end of the piston rod 96 carries a transversely extending handle 98, and, immediately below it, a pivoted lever 100 which likewise extends transversely therefrom.

An operating rod 102 extending in parallelism with the piston rod 96 is connected at its upper end with the intermediate portion of the pivoted lever 100 and, at its lower end, to the handle or lever 104 which rotates the stem of the three-way valve 86 to effect the flow of liquid in the manner described shortly hereinbefore.

The upper end of the piston rod 96 also carries a pin 106 to which there is attached a depending chain 108, the latter being adapted to cooperate at various positions along its length with a catch 110 which is mounted on the head of the cylinder 80. By this means, the upper limits of travel of the piston 92 may be accurately and variably adjusted; and, accordingly, the quantity of the liquid which is moved by said piston from the cylinder 80, through the appropriate ports in the three-way valve 86, and into and through the bore of the tubular injection probe 60.

While we have shown and described several specific embodiments of the present invention, it will be readily understood that we do not wish to be limited exactly thereto, since various modifications may be made without departing from the scope of the invention as defined in the appended claims.

We claim:
1. A portable apparatus for injecting a measured amount of liquid anhydrous ammonia into the earth comprising, in combination:

a handle;

an elongate frame member depending from said handle;

a hollow injection probe adapted to be inserted into the earth depending from said frame member;

a cylindrical measuring means supportedly attached to said frame member, said measuring means comprising a tubular member having an enclosed end and an open end, a piston disposed between said ends, a tubular cap for said open end and threadedly engagable with the exterior side wall of said tubular member, said cap having therein a concentrically disposed plug of a diameter closely conforming to the internal diameter of the tubular member, a first conduit means in open communication with said enclosed end of the cylindrical measuring means and a second conduit means in open communication with said open end of the cylindrical measuring means through said tubular cap;

a portable source of liquid ammonia;

a liquid ammonia flow control means communicating with said probe and with both of said conduit means;

a hose means connecting said source of liquid ammonia with said flow control means; and an actuating means for permitting liquid ammonia to flow from said source through said flow control means into one of said conduit means, said flow control means simultaneously permitting accumulated ammonia within said measuring means to flow through the conduit communicating therewith and thence into said injection probe.

2. A combination in accordance with claim 1 wherein said flow control means is a multiple port valve.

3. A combination in accordance with claim 2 wherein said actuating means is foot operated.

4. A combination in accordance with claim 2 wherein said actuating means is hand operated.

References Cited in the file of this patent
UNITED STATES PATENTS

| | | |
|---|---|---|
| 797,531 | Peters | Aug. 15, 1905 |
| 951,760 | Foulke | Mar. 8, 1910 |

FOREIGN PATENTS

| | | |
|---|---|---|
| 233,400 | Australia | Apr. 23, 1959 |
| 992,758 | France | July 11, 1951 |
| 1,050,108 | Germany | Feb. 5, 1959 |
| 419,373 | Italy | Mar. 24, 1947 |
| 276,937 | Switzerland | Oct. 15, 1951 |